United States Patent [19]
Okita

[11] Patent Number: 4,737,948
[45] Date of Patent: Apr. 12, 1988

[54] DISK CLAMP DEVICE

[75] Inventor: Masao Okita, Furukawa, Japan

[73] Assignee: Alps Electric Co., Ltd., Japan

[21] Appl. No.: 761,049

[22] Filed: Jul. 31, 1985

[30] Foreign Application Priority Data

Jul. 31, 1984 [JP] Japan .................. 59-116303[U]

[51] Int. Cl.⁴ .................. G11B 17/04; G11B 5/82
[52] U.S. Cl. .................. 369/270; 360/99
[58] Field of Search .......... 369/270, 271; 360/99, 360/86, 133

[56] References Cited

U.S. PATENT DOCUMENTS

| | | |
|---|---|---|
| 3,768,815 | 10/1973 | Mathurin .................. 369/270 |
| 4,125,883 | 11/1978 | Rolph .................. 369/270 |
| 4,208,682 | 6/1980 | Bryer .................. 360/99 |
| 4,218,065 | 8/1980 | Van der Hoek et al. .......... 369/271 |
| 4,413,294 | 11/1983 | Beijer .................. 360/99 |
| 4,420,830 | 12/1983 | Green .................. 360/99 |
| 4,574,323 | 3/1986 | Momose .................. 360/99 |
| 4,575,837 | 3/1986 | Okita .................. 369/270 |
| 4,592,040 | 5/1986 | Ohsaki .................. 369/270 |

*Primary Examiner*—Steven L. Stephan
*Attorney, Agent, or Firm*—Guy W. Shoup

[57] ABSTRACT

A disk clamp device for a recording-reproducing device includes a clamp member. The clamp member has one or more turn-up pawl portions of a shape created by inflecting inward the point of each guide portion for centering the disk, which guide portion extends in the direction of fitting in a concave portion formed in a turntable being driven to rotate.

3 Claims, 3 Drawing Sheets

DISK CLAMP DEVICE

BACKGROUND OF THE INVENTION

1. Field of the Invention

This invention relates to a disk clamp device, equipped in a recording-reproducing device, for clamping a disk to give turning force thereto.

2. Description of the Prior Art

Various kinds of information processing devices recently marketed are employing a recording-reproducing device utilizing magnetism. The recording-reproducing device operates in such a manner that after a disk (a flexible magnetic disk, for example) is placed on a spindle, this spindle is drivent o rotate the disk. While it is rotating, a magnetic head is positioned as to oppose to a recording face of the disk and recording/reproducing of information is performed.

As the disk clamp device being employed in such recording-reproducing devices, an arrangement as shown in FIGS. 5 and 6 has been proposed in the prior art. FIG. 5 is a sectional view of the disk clamp device at the time of insertion of the disk, and FIG. 6 is a plane view of a clamp member included in this disk clamp device. Incidentally, this disk clamp device is assembled in the recording-reproducing device for driving the magnetic disk.

In these drawings, the symbol 5 indicates a base frame. On this base frame 5 a spindle 1 coupled to a motor (not shown) is supported via a bearing 6. To the upper end of this spindle 1 a turntable 7 is fixed. In the center of this turntable 7 a concave portion 7a is formed around the spindle 1. On the upper face 7a of this turntable 7 a flexible magnetic disk 2 is placed. For reference, the diameter of this concave portion 7a is substantially equal to the diameter of a drive shaft insertion hole (not shown) bored at the center of the magnetic disk 2.

The symbol 3 indicates a frame. This frame 3 is pivoted in the arrow A directions in FIG. 5 and opposes approach-/separate-ably to the turntable 7. This frame 3 has a hole 3a bored therein, through this hole 3a a shaft 4 passes, this shaft 4 is smaller in diameter than the hole 3a, thus, the shaft 4 is allowed to move in radial directions within the hole 3a. At the upper end of the shaft 4 a snap 8 is fitted. This snap 8 is stopped by the upper face of the frame 3 via a washer plate 9, so that the shaft 4 is prevented from coming off. To the lower end of the shaft 4 a clamp member 11 is attached via a bearing 10.

This clamp member 11 is made of resin and molded integrally, in its center a hole 12 is bored, and at a lower portion of this hole 12 a projection 13 is provided circularly facing the inside of the hole 12. The bearing 10 force-fitted in the hole 12 is stopped by the projection 13 and fixed there. Further, a flange 4a formed at the lower end of the shaft 4 is brought to the hole (12) portion underside the projection 13, and this flange 4a is stopped by the projection 13. From the whole upper periphery of the hole 13 an arm portion 14 is extending outward. The points of this arm portion 14 are curved downward. Press portions 15 are formed on the end faces of the curved point portions. That is, to the upper faces of these press portions 15 the points of the arm portion 14 are connected. The lower end of each press portion 15 defines a flat press face 15a. This press face 15a is opposing to the upper face 7b of the turntable 7. To the inside of this press portion 15 one end of a guide portion 16 is joined. In all, a number of paired guide portions 16 are provided along the inner periphery of the press portions 15 with an equal spacing. Further, in the arm portion 14 there are formed relief holes or slits 17 to bring the respective guide portions 16 up from a die in the molding process. Each guide portion 16 is composed of an engaging face 18 extending vertically downward from the inside of the press portion 15 and a guide face 19 further extending obliquely inward from the lower end of the engaging face 18, and is molded so as to have a relatively thin thickness to exhibit flexibility. The diameter D1 of the engaging faces 18 is designed as to be larger a little than the inner diameter D2 of the concave portion 7a of the turntable 7. Thus, the engaging faces 18 can fit tightly in the concave portion 7a with some elastic deformation. The symbol 11a indicates a reinforcing rib for supporting the arm portion 14. A compression spring 20 is interposed between the bearing 10 force-fitted in the hole 12 of the clamp member 11 and the inner face of the frame 3.

Now, the operation of the disk clamp device of the foregoing structure proposed in the prior art will be described.

In the initial state, the frame 3 is raised beforehand by means of a spring and the like (not shown). In this position, the clamp member 11 is pushed by the compression spring 20 via the bearing 10, and the projection 13 formed inside the hole 12 is stopped by the flange 4a formed on the shaft 4, so prevented from coming off.

The magnetic disk 2 is inserted in the arrow B direction shown in FIG. 5 through an insertion opening (not shown) of the recording-reproducing device, and a drive shaft insertion hole (not shown) of the magnetic disk 2 is brought above the concave portion 7a of the turntable 7. Thereafter, the frame 3 is pivoted manually or by other means to go down. In response thereto, the clamp member 11 approaches gradually the turntable 7. Then, the lower end of each guide face 19 of the clamp member 11 passes first through the drive shaft insertion hole of the magnetic disk 2 and is brought within the concave portion 7a of the turntable 7. During the above movement, the peripheral margin of the drive shaft insertion hole of the magnetic disk 2 contacts slidingly with each guide face 19, and the magnetic disk 2 is pushed in radial directions. Concurrently therewith, if the shaft 4 is displaced axially with respect to the spindle 1, the guide faces 19 are guided by the concave portion 7a of the turntable 7 and their axial centers are made harmonized. In this way, during the downward movement of the clamp member 11, the center of the magnetic disk 2 is gradually brought on the axis of the spindle 1 (the provisional centering). When the engaging faces 18 of the clamp member 11 are brought within the concave portion 7a of the turntable 7, because the diameter D1 of the engaging faces 18 has the relation, D1>D2, in connection with the diameter D2 of the concave portion 7a, the engaging faces 18 are guided by the peripheral margin of the concave portion 7a and deforms elastically inward. During the above, the drive shaft insertion hole of the magnetic disk 2 is pushed by the engaging faces 18 and forms the concentric circles with the inner diameter D2 of the concave portion 7a, thus, the subject centering is completed. Concurrently therewith, the press faces 15a of the press portions 15 formed on the clamp member 11 approach the upper face 7b of the turntable 7. Then, when the press faces 15a abut on the upper face 7b of the turntable 7 via the magnetic disk 2, the clamp member 11 terminates its lowering. Then, as the frame 3 goes down further, the compression spring 20 is pressed, this pushing force is transmitted through the bearing 10 and the projection 13 of the clamp member 11 to the arm portion 14. Thus, this arm portion 14 pushes the press portions 15 from above. As a result, the press faces 15a push the magnetic disk 2 evenly onto the upper face 7b of the turntable 7. Thus, the magnetic disk 2 is secured surely on the upper face 7b of the turntable 7. Then, as the frame 3 reaches the bottom dead point, its lowering action terminates and the centering and clamping operation of the magnetic disk 2 is completed.

Following the above, as the spindle 1 in the stopped state is driven the magnetic disk 2 starts to rotate, and the magnetic head (not shown) opposing to the recording face of the magnetic disk 2 is permitted to perform reading/writing of information.

As the frame 3 is pivoted as to rise, the clamp member 11 is returned to its initial state by the recoil strength of the compression spring 20.

However, not that the foregoing prior art has no problem. Recently, the recording-reproducing device for driving the magnetic disk has a tendency to become small in size, and, in connection therewith, the pivotable angle of the frame 3 of the disk clamp device is becoming limited small. Accordingly, as shown in FIG. 5, the possibility that at the time of insertion of the magnetic disk 2 its point portion may abut and catch on the point of some guide portion 16 of the clamp member 11 is becoming increasing. Thus, due to such catching, smooth insertion of the magnetic disk 2 is disturbed, the magnetic disk 2 suffers plastic deformation in case the disk is housed in a soft case to give a bad influence to the recording-reproducing property, or some guide portion 16 of the clamp member 11 suffers plastic deformation in case the magnetic disk 2 is housed in a hard case to result in an uncertain clamping of the disk.

SUMMARY OF THE INVENTION

It is the object of the present invention to overcome the foregoing drawbacks of the prior art, and to provide a disk clamp device which permits always smooth insertion of a disk and has no fear of damaging the disk or clamp member at the time of disk insertion.

In order to achieve the above object, the present invention resides in a disk clamp device of the type in that a concave portion whose diameter is identical to that of a drive shaft insertion hole of a disk is formed in a turntable about a turntable shaft being driven to rotate, a frame is provided above the turntable in opposition thereto and pivoted as to go up and down, and a clamp member is provided on a shaft supported by the frame, and is characterized in that the clamp member is composed of a press face which abuts via the disk on the turntable, an arm portion for transmission of applied pressure which extends from the upper side of the press face toward the clamp member supporting shaft, a guide portion for centering which extends from the inside of the press face in the direction of fitting in the concave portion, and a turn-up pawl portion of a shape created by inflecting inward the point of the guide portion, whereby by means of the turn-up pawl portion the disk is prevented from being caught thereon.

BRIEF DESCRIPTION OF THE DRAWINGS

FIGS. 1 through 4 concern an embodiment of the present invention in which

FIG. 1 is a sectional view of the embodiment disk clamp device at the time of disk insertion;

FIG. 2 is a plane view of a clamp member employed in the device shown in FIG. 1;

FIG. 3 is a bottom view of the clamp member;

FIG. 4 is a sectional view taken along line C—C in FIG. 3;

DESCRIPTION OF THE PREFERRED EMBODIMENT

Now, the embodiment of the present invention will be described with reference to FIGS. 1 through 4.

Figure 3:
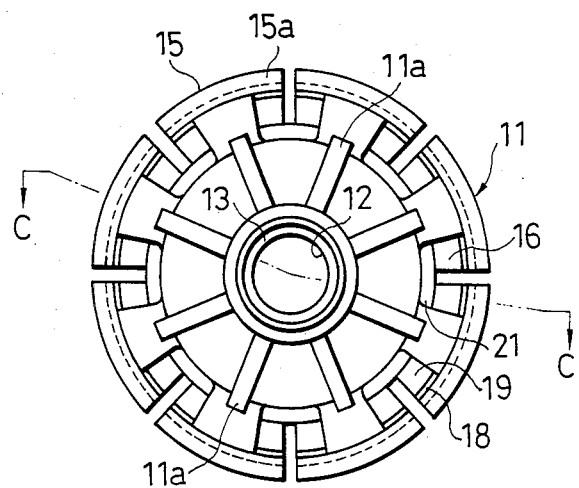
Figure 4:
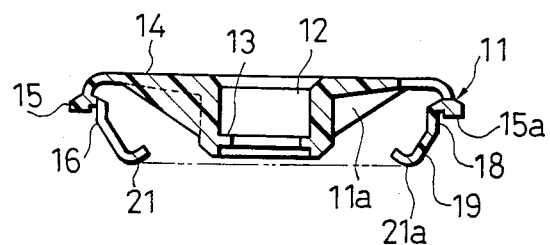
Figure 5:
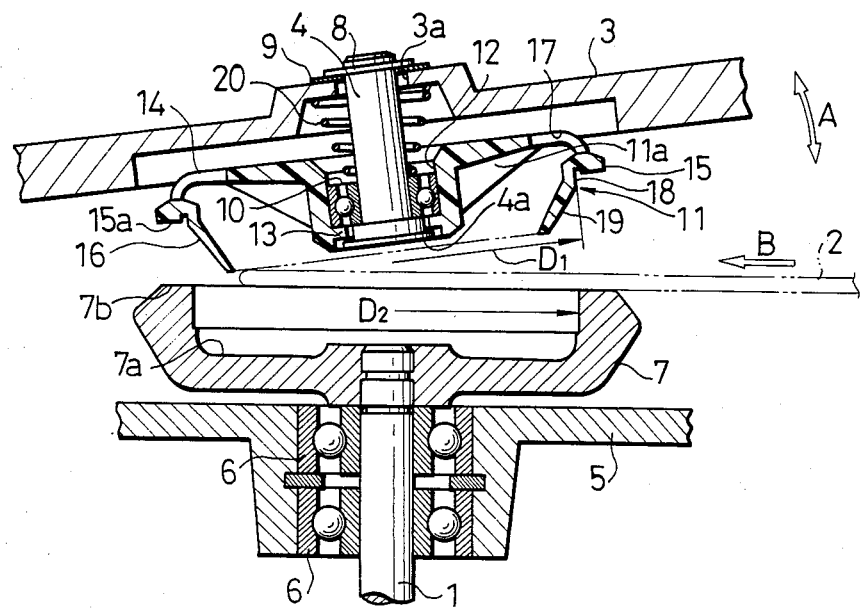
FIG. 5 is a sectional view of the disk clamp device, at the time of disk insertion, proposed in the prior art.
Figure 6:
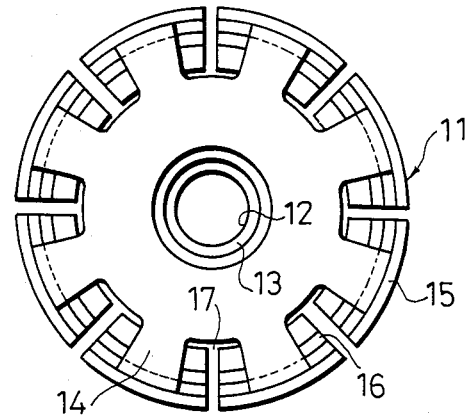
FIG. 6 is a plane view of a clamp member employed in the device shown in FIG. 5.

In FIGS. 1 through 4, the parts and portions corresponding to those of the conventional device shown in FIGS. 5 and 6 bear the same symbols, so, their description is omitted. Incidentally, the present disk clamp device is assembled in the recording-reproducing device for driving the magnetic disk.

Figure 1:
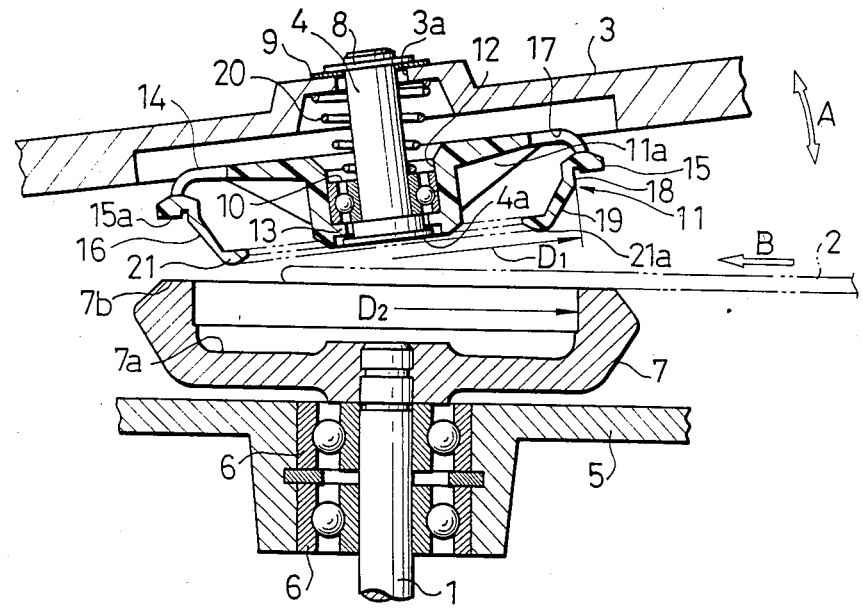
Figure 2:
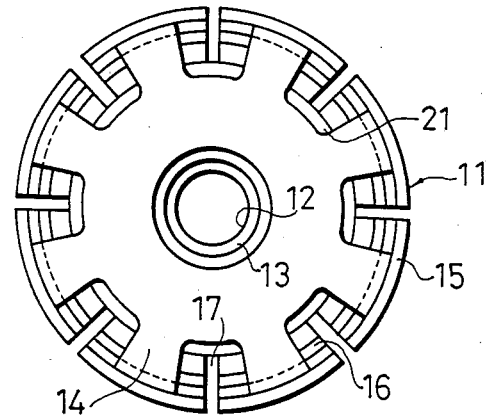

The symbol 21 indicates a turn-up pawl portion of the clamp member 11, having a shape created by inflecting inward the point of the guide portion 16, and the symbol 21a indicates a turn-up curved face at the lower margin of the turn-up pawl portion 21. This clamp member 11 is molded integrally by resin, and, as shown in FIGS. 2 through 4, it features the structure that in the lower portion of the hole 12 bored in the center the projection 13 is provided circularly, from the whole upper periphery of this hole 12 the arm portion 14 is extending outward, and points of this arm portion 14 are curved downward and connected to the press portions 15. The lower end of each press portion 15 defines the press face 15a, inside the press portions 15 a plurality of paired flexible guide portions 16 of a relatively thin are provided at an equal spacing, and each guide portion 16 is composed of the engaging face 18 extending vertically downward and the guide face 19 extending obliquely inward from the lower end of the former. The lower end of each guide face 19 is continuous with the turn-up pawl portion 21 to form the turn-up corved, smooth face 21a, and, as apparent from FIGS. 1 and 4, the turn-up pawl portion 21 faces inward and somewhat upward, so that the point of the pawl portion is higher in elevation than the turn-up curved face 21a. Further, as apparent from FIGS. 2 and 3, the turn-up pawl portion 21 serves as a bridge for connecting together the points of paired guide portions 16, thus, the mechanical strength of each guide portion 16 is increased and there is little fear of resulting in an undesired deformation at the time of its molding and in the course of use. The symbol 11a indicates a reinforcing rib to support the arm portion 27, and the symbol 17 indicates the relief hole effective in bringing up from a die.

In the disk clamp device equipped with the clamp member 11 of the foregoing structure (see FIG. 1), the guide faces 19 of the guide portions 16 come first into contact slidingly with the peripheral margin of the drive shaft insertion hole of the magnetic disk 2, thereby achieving the provisional centering, then, the engaging faces 18 push the peripheral margin of the drive shaft insertion hole, thereby achieving the subject centering. Simultaneously with the above, the pushing force of the compression spring 20 is transmitted through the bearing 10 and the projection 13 of clamp member 11 to the arm portion 14, in turn the press faces 15a of the press portions 15 push the magnetic disk 2 onto the upper face 7b of the turntable 7, thereby completing the clamping.

The foregoing operation is identical to the prior art, so, its detailed description is omitted.

With the reduction in thickness of the recording-reproducing device, the pivotable angle of the frame 3 becomes limited small, thus, the point of the magnetic disk 2 becomes easily abutable on the clamp member 11 at the time of disk insertion. However, since the clamp member 11 according to the present invention is designed so that the point of each guide portion 16 is inflected inward to form the turn-up pawl portion 21, the magnetic disk 2 will abuts only on some turn-up curved face 21a, if happens, at the time of disk insertion and no catching occurs therebetween. That is, even though the magnetic disk 2 abuts on some turn-up curved face 21a, the both will contact with each other smoothly and slidingly and some flexible guide portion 16 deflects upward simply. When the magnetic disk 2 is inserted a certain extent, the thus deflected guide portion 16 is brought in the drive shaft insertion hole, thus returns to the initial state. Accordingly, insertion of the magnetic disk 2 is scarcely disturbed, an excessive force is not applied because no catching happens, thus, there rises scarcely a danger that the magnetic disk 2 or clamp member 11 is damaged.

As apparent from the foregoing description, according to the present invention, the turn-up pawl portion is formed at the point of each guide portion of the clamp member, accordingly, the disk is not caught on the clamp member at the time of disk insertion even if the pivotable angle of the frame is limited small, insertion of the disk is always performed smoothly, and there rises at the time of disk insertion no fear of the disk or clamp member being damaged.

While the preferred embodiment has been described, variations thereto will occur to those skilled in the art within the scope of the present inventive concepts which are delineated by the following claims.

What is claimed is:

1. In a disk clamp device of the type having a turntable with a central concave portion and an upper annular face onto which a disk having a central hole is inserted from a lateral direction and supported for rotation, a clamp member mounted on a shaft supported on a frame which is angularly pivotable toward and away from the turntable for centering and clamping a disk thereon, said clamp member including an arm portion extending radially from a central mounting of said clamp member to said shaft, a press portion on an end of said radially extending arm portion and having a lower press face which abuts with said upper annular face of said turntable for clamping the disk thereon, and a flexible guide portion extending from said press portion downward and radially inward in an oblique direction toward said shaft for insertion through the central hole of the disk into said concave portion of said turntable for centering the disk operatively thereon, the improvement comprising said guide portion having at its downward end a flexible turn-up pawl portion having a smooth curved lower face and a shape which inflects upwardly and radially inwardly to a deflectable free end which is higher in elevation than the curved lower face, wherein when said frame is pivoted upwardly and said clamp member is spaced at an inclined angle above said turntable to allow insertion of a disk from the lateral direction between said clamp member and said turntable, the leading edge of the inserted disk can abut the curved lower face of said turn-up pawl portion smoothly and slidingly so as to allow deflection of the guide portion upwardly and thereby prevent any damage to the disk due to its catching on the downward end of said guide portion.

2. A disk clamp device as set forth in claim 1, wherein said clamp member includes plural turn-up pawl portions, plural guide portions and plural press faces, correspondingly.

3. A disk clamp device as set forth in claim 1, wherein said clamp member is formed integrally by molding.

* * * * *